United States Patent [19]

Keino et al.

[11] Patent Number: 4,515,849

[45] Date of Patent: May 7, 1985

[54] TRANSFER PRINTING SHEET, PRINTING METHOD AND PRINTED ARTICLE

[75] Inventors: Goro Keino; Yosuke Kitagawa, both of Ohtsu; Yoshimi Hayashi, Kyoto, all of Japan

[73] Assignee: Matsui Shikiso Chemical Co. Ltd., Japan

[21] Appl. No.: 499,911

[22] Filed: Jun. 1, 1983

[51] Int. Cl.[3] .......................... B32B 3/10; B32B 7/06; B44C 1/16

[52] U.S. Cl. .................................... 428/201; 156/230; 156/239; 156/240; 428/202; 428/204; 428/211; 428/914

[58] Field of Search ............... 428/201, 204, 202, 211, 428/914; 156/239, 230, 240

[56] References Cited

U.S. PATENT DOCUMENTS

| | | | |
|---|---|---|---|
| 4,234,643 | 11/1980 | Grotefend et al. | 428/204 X |
| 4,318,953 | 3/1982 | Smith et al. | 428/204 X |
| 4,370,370 | 1/1983 | Iwata et al. | 428/202 X |

*Primary Examiner*—Thomas J. Herbert
*Attorney, Agent, or Firm*—McGlew & Tuttle

[57] ABSTRACT

A transfer printing sheet comprising a base sheet, a releasing resin layer coating the surface of the base sheet entirely or partially, a layer of a pattern printed on the release resin layer and comprising an elastic high-polymer resin and a pigment in admixture, and a layer containing an agent for dissolving synthetic fibers and covering the entire surface of the pattern layer. When the sheet is subjected to heat and pressure, the pattern of the pattern layer can be transferred onto a fabric of synthetic fiber in contact with the layer containing the dissolving agent to give a distinct print having a soft hand and outstanding color fastness against rubbing, washing and light.

12 Claims, 2 Drawing Figures

TRANSFER PRINTING SHEET, PRINTING METHOD AND PRINTED ARTICLE

FIELD AND BACKGROUND OF THE INVENTION

The present invention relates to a transfer printing sheet for marking articles of synthetic fibers with a distinct colorfast design or pattern and having a soft hand or feel by heat transfer printing, and to the corresponding printing method and printed article produced thereby.

Designs or patterns are conventionally printed on shaped articles of synthetic fibers, by impressing the designed design on the article by the usual method of printing with a printing ink comprising a dye for synthetic fibers, and then subjecting the printed article to heating treatment with steam. Other known printing methods use pigmented resins which are prepared by admixing pigments with various synthetic resin emulsions, or printing inks in which synthetic resins are similarly contained as vehicles.

However, the former method wherein printing ink dyes are used requires a cumbersome process including a long period of heat treatment with steam, followed by washing with water for the removal of glue, drying, etc. for synthetic fibers of any given type; fails to produce a distinct design although the colored article retains a good hand or feel; and is totally unusable for colored fabrics since a white dye is not available which has hiding power as is necessary in such a case.

On the other hand, the latter method which uses pigments and synthetic resins in combination has the advantage that the design or pattern can be fixed by only a relatively short period of heat treatment or drying and in turn can be made colorfast when the synthetic resin is self-crosslinkable or is used conjointly with a crosslinking agent so as to be curable in the presence of a catalyst or moisture or by oxidation in air or irradiation with radiation; and has the further advantage that a white pigment can be used as desired.

Synthetic resins useful for the above mentioned method are chiefly polyacrylate copolymer resins, melamineformaldehyde resins, etc., which assure very satisfactory color fastness and exhibit resistant properties on cotton, hemp, rayon and like natural fibers, but which nevertheless are very low in strength on shaped articles of synthetic fibers which are chiefly polyester fibers and further include nylon, polyacrylyic and like fibers. Moreover, when crosslinked as described above, these resins seriously impair the hand or feel of synthetic fibers and do not always exhibit improved durability. Accordingly, these resins are normally used only for giving very pale color prints on synthetic fibers, and generally merely on blends with natural fibers.

To overcome the foregoing drawbacks of conventional methods, transfer printing methods have found wider use in recent years, although these methods still have drawbacks.

For example, the dry sublimation transfer printing method for polyester fibers is not usable for colored articles.

Also, the method employing heat transfer sheets which comprise a pigment and a meltable or thermoplastic synthetic resin in admixture makes use of the tackiness or thermal adhesion of the synthetic resin to give sharp patterns conveniently and economically. With this method, however, the resin coating is merely adhered to the article printed therewith by plastic flow contact with the otherwise unmodified fibers of the article, such that the print is low in durability, especially in resistance to rubbing and washing, like those prepared by direct printing.

Thus, extreme difficulties have heretofore been encountered in attempts at printing sharp colorfast designs or patterns on shaped articles of various synthetic fibers.

SUMMARY OF THE INVENTION

It is among the objects and advantages of the present invention to overcome the foregoing drawbacks and deficiencies of the prior art and to provide a unique transfer printing sheet for printing a design or pattern on a fabric of synthetic fiber or of a material containing synthetic fiber with the application of heat and pressure by way of a corresponding printing method, and to obtain in turn a corresponding printed article provided with a flexible and very distinct print having outstanding color fastness against abrasion, washing, light, etc.

Other and further objects and advantages of the present invention will become apparent from a study of the within specification and accompanying examples.

In connection with extensive research which has been conducted to improve the foregoing conventional methods, it has been found advantageously in accordance with the present invention that a unique transfer printing sheet may now be described.

Broadly, the instant transfer printing sheet comprises a base sheet coated with a releasing resin, an intermediate pattern layer formed over the resulting release resin coating or base layer and containing a pigment and an elastic high-polymer resin or the like, and a top layer of a synthetic fiber dissolving agent or modifying agent formed over the entire surface of the pattern layer.

When the above three-layer or multi-layer transfer printing sheet is subjected to printing pressure and heat with the surface of the dissolving agent layer in contact with the article of synthetic fiber to be printed therewith, the dissolving agent of the dissolving agent layer advantageously suitably dissolves or otherwise modifies the adjacent synthetic fibers of the article and, at the same time, the pattern layer is transferred, e.g. under heat flow, to the article and fixed thereto at the so modified fibers thereof. Hence, it has been found that the article can be printed by way of the present invention with a colorfast and distinct pattern in a flexible pattern layer without impairing the hand or feel of the article, irrespectively of whether the article is colorfast or not.

The various features of novelty which characterize the invention are pointed out with particularity in the claims annexed to and forming a part of this disclosure. For a better understanding of the invention, its operating advantages and specific objects obtained by its uses and inherent features, reference is made to the accompanying descriptive matter in which preferred embodiments of the invention are illustrated.

BRIEF DESCRIPTION OF THE DRAWINGS

The present invention will now be described in greater detail with reference to the accompanying drawings, in which.

DESCRIPTION OF THE PREFERRED EMBODIMENTS

Figure 1:
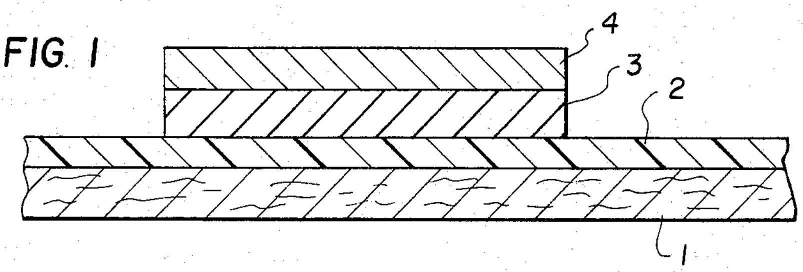
FIG. 1 is an enlarged schematic view in section showing a transfer sheet embodying the present invention.
Figure 2:
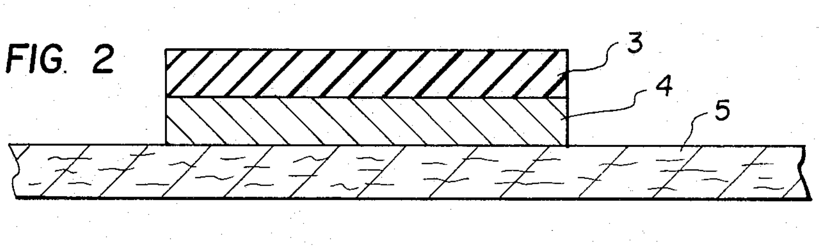
FIG. 2 is an enlarged schematic view in section showing an article bearing a pattern transferred thereto with the use of the transfer sheet according to the present invention.

With reference to the drawings, the transfer sheet of the present invention (FIG. 1) comprises a base sheet 1, e.g. of cellulosic fiber paper, a releasing resin layer 2 coating a coatable surface of the base sheet 1, a pattern layer 3 comprising an elastic high-polymer resin and a pigment in admixture and formed by printing a pattern of desired form or design on the releasing resin layer 2, and a dissolving agent layer 4 covering the entire surface of the pattern layer 3 and containing an agent for dissolving or otherwise surface modifying the adjacent synthetic fibers of the article 5 to be marked or printed therewith (FIG. 2).

Examples of useful coatable surface materials for the base sheet 1 of the present invention are cellulose paper, synthetic fiber paper, synthetic paper, cellophane, synthetic resin film, fabric, etc.

The release resin layer 2 coating the base sheet 1 is prepared from one or a mixture of cellulose derivatives such as ethylcellulose and acetylcellulose, wax, wool wax, shellac, rosin and like natural resins, polyolefin resin, vinyl resin, silicone resin, fluorine-containing resin and like synthetic resins, etc., by coating the surface of the base sheet 1 entirely or partially with such releasing resins in the form of a solution or in a molten state, as appropriate or desired.

The releasing resin layer 2 advantageously specifically serves as a protective discrete separation layer which prevents the synthetic resin and pigment of the pattern layer 3 to be printed thereon from penetrating into the base sheet 1, e.g. under heat and mechanical pressure, and also assures smooth release or separation of the pattern layer 3 from the base sheet 1 for complete and efficient transfer.

The intermediate pattern layer 3 in turn provided on the lowermost or bottom releasing resin layer 2 by printing the desired pattern thereon consists essentially of an elastic high-polymer resin and a pigment admixed therewith. The pattern is printed on the releasing resin layer 2 with the use of a printing ink containing the mixture of the pattern layer ingredients, such as by using a plate which is reverse to the usual printing plates in orientation in order that the pattern of the pattern layer 3 will be in proper obverse orientation when transferred onto the article 5.

The elastic high-polymer resin of the pattern layer 3 is preferably one giving a soft and flexible coating having rubber-like elasticity or corresponding elastic and/or flexible properties similar thereto and can be selected, for example, from among high-polymer, i.e. high molecular weight polymer, resins such as ethylene-vinyl acetate copolymer resin, vinyl chloride-vinyl acetate copolymer resin, ethylene-acrylate copolymer resin, acrylonitrile resin, chlorosulfonated polyolefin resin, saturated polyester resin, butadiene resin, etc.

The elastic-high polymer resin desirably or preferably has a melting point or softening point, i.e. a heat flowable point or heat flow point, of substantially between about 50° to 105° C., is favorably transferred in a molten or softened state, i.e. is heat flowed or hot flowed, onto the article 5 to be printed along with the dissolving agent layer 4 to be described below, and is then fixed to the adjacent synthetic fibers at the surface of the article 5. It will be appreciated that the elastic high-polymer resin does not penetrate into the article 5 according to the present invention, whereas such penetration does occur in the case of conventional direct printing, and therefore the instant elastic high-polymer resin acts to give improved rubbing fastness and wash fastness with a flexible or soft feel or handle, without impairing the hand of the article as otherwise occurs.

While one or preferably at least two in combination of the foregoing elastic high-polymer resins may be selectively usable in accordance with the particular contemplated purpose, the elastic resin, when necessary, can be a heat-crosslinkable resin, for example such as alkoxymethylacrylamide copolymer resin, glycidyl methacrylate resin, alkoxymethylated nylon resin or the like, and such can be used conjointly with butoxymethylolmelamine resin, spiroacetal-type guanamine resin or the like, whereby a further improvement in turn can be achieved in various fastness properties by reason thereof.

Examples of useful pigments for the elastic high-polymer resin containing pattern layer 3 are iron oxide, ultramarine, titanium oxide, zinc white, carbon black or like inorganic pigments, azo, diazo, anthraquinone, quinacridone, indolenine, phthalocyanine, lake and like organic pigments, aluminum powder, mica fragments, fish scale powder, copper alloy powder, fragments of vacuum-evaporated metal and like glossy pigments, light accumulating pigments, daylight fluorescent pigments and like luminescent pigments, lead glass beads, vinyl acetate beads and like pigments in the form of beads, colored cellulose powder, colored synthetic resin powder and like pigment analogues, and mixtures of at least one of these pigments and an extender pigment such as barium sulfate, clay, calcium carbonate, aluminum silicate or the like. The pigment to be used is selected in view of the desired distinctness, fastness, hiding power, etc. sought, as the artisan will appreciate.

The printing ink containing a mixture of elastic high-polymer resin and pigment for printing a pattern as the pattern layer 3 on the releasing resin layer 2 generally further comprises an evaporatable solvent of the conventional type. When required, this ink may further incorporate therein a resin curing agent, plasticizer, surfactant, lubricant, stabilizer, ultraviolet absorber, viscosity adjusting agent, defoaming agent, oil or fat, wax, perfume, blowing agent, fluorescent whitening agent, etc., in conventional manner, within the scope of the present invention.

The printing ink for forming the pattern layer 3 is prepared in the form of a solution, emulsion, microcapsules or the like. The pattern layer 3 is printed on the releasing layer 2 in the form of the ink, which as may be appropriate is then dried in the usual manner to evaporate off the solvent, e.g. an organic solvent such as a volatile solvent.

The present invention includes within its scope a case wherein the pattern layer 3 comprises superposed layers; i.e. for example, the pattern layer 3 is provided as a composite layer subdivided into a colored pigment bottom sub-layer and a white pigment top sub-layer in superimposed stratified disposition on the releasing resin layer 2.

Next, the dissolving agent layer 4 is formed over the entire surface of the pattern layer 3 by printing with use of a printing ink containing at least one agent for dissolving synthetic fibers, or by depositing the at least one dissolving agent on the pattern layer 3 by spraying or implanting particles of or containing the dissolving agent onto the pattern layer 3 in conventional manner.

The dissolving agent layer 4 performs the remarkable function of dissolving, eroding, swelling and/or otherwise modifying, as the case may be, the surface layer or portion of the article 5 of synthetic fiber to render the same locally receptive to the elastic high-polymer resin so that the pattern layer 3 can be firmly adhered to the article via the so modified synthetic fiber surface layer. This is a major feature of the present invention.

Examples of synthetic fiber dissolving agents or surface modifying agents (hereinafter and in the claims, collectively "dissolving agents") useful for the dissolving agent layer 4 are such dissolving agents of monomeric organic compound constitution and of inorganic compound constitution as phenol, ammonium phenoxide, β-naphthol, m-cresol, resorcin, p-phenylphenol and like phenols; β-naphthol methyl ether, phenetole and like ethers; methyl salicylate, methyl β-hydroxynaphthoate, phenyl benzoate, ethyl p-hydroxybenzoate, dimethyl phthalate and like esters; o-dichlorobenzene, mixed trichlorobenzene and like halides; dimethylformamide, o-toluenesulfoamide, bis-toluenesulfoimide, potassium salt thereof and like amides and imides; benzoic acid, phthalic acid, salicylic acid, formic acid, p-toluenesulfonic acid and like organic acids; methylnaphthalene, diphenyl and like aromatic hydrocarbons; acetophenone, benzophenone, isophorone and like ketones; benzaldehyde, cinnamaldehyde and like aldehydes; diphenylamine, o-chloroaniline, toluidine and like amines; imidazoles, quinoxaline, quinoline, benzotriazoles and like heterocyclic compounds; zinc chloride, stannic chloride, zinc thiocyanate, zinc borofluoride, sulfamic acid and like inorganic compounds; etc. These active, synthetic resin dissolving or surface modifying agents are rapidly activated by heating. At least one of these examples of a synthetic resin dissolving agent is selected for use in accordance with the properties of the synthetic fiber forming the article 5, i.e. so as to be specifically capable of dissolving the synthetic fiber of which the surface of the article 5 is composed or formed or of otherwise modifying the surface of such synthetic fibers to render them bond receptive to the elastic resin of the pattern layer 3.

When subjected to conventional mechanical printing pressure and heat for transfer printing, the dissolving agent advantageously and specifically attacks the adjacent synthetic fiber at the surface of the article 5 in question and breaks or breaks down the crystallinity of the fibers, and thereafter either vaporizes off itself or remains fixed to the fiber along with the pattern or is absorbed by or into the fibers, as the case may be, without detriment to the resulting strong bond between the pattern layer 3 and the synthetic fibers at the surface of the article 5.

Thus, the dissolving agent layer 4 of the present invention has the function of dissolving or otherwise modifying the adjacent surface portions of the synthetic fibers for holding, affixing and/or bonding the elastic high-polymer resin, etc. of the pattern layer 3, in effectively adhered relation to, or of adhering the same to, the fiber structure of the article 5 at the surface portion thereof to be printed, thereby producing a surprisingly outstanding effect.

Preferably, the printing ink for forming the dissolving agent layer 4 over the entire surface of the pattern layer 3 further contains as admixed ingredient with the dissolving agent an elastic high-polymer resin or a water-soluble glue, here serving as a film forming substance.

In addition to the solvent, the ink for the dissolving agent layer 4 may further incorporate in conventional manner the usual additives, such as a surfactant, extender, coloring agent, plasticizer, stabilizer, cross-linking agent, catalyst, etc. when so desired.

The dissolving agent of the dissolving layer 4, of course, can be used in the form of a liquid, particles or microcapsules as desired.

When particles of the dissolving agent are used, such as by spraying or electrostatic implanting, the dissolving agent can be applied while the surface of the pattern layer 3 which has previously been printed is still wet or tacky, but the surface of the resulting transfer sheet is then likely to have difficulty in intimately adhering to the article 5 to be printed. In such an event, it is desirable to provide an auxiliary adhesive layer over the dissolving agent layer 4, i.e. for immediate or direct contact with the surface of the article 5.

Although dependent on the properties of the synthetic fibers at the surface of the article 5 to be printed, the use of an excess of the dissolving agent is generally objectionable, since the dissolving agent will then either completely break down the fiber structure or otherwise hamper the adhesion of the pattern layer 3 thereto. Accordingly, due care should be taken of its amount, i.e. to minimize or avoid substantially completely an excess of the dissolving agent beyond that amount needed for achieving substantially firm adhering of the pattern layer 3 to the synthetic fibers of the article 5. However, if the article 5 has a coarse structure like a carpet, pile rug, etc., a very large amount of agent will nevertheless be needed, so that in effect two dissolving agent layers can be correspondingly formed in such a case without detriment to the desired adhesion of the pattern layer 3 to the article 5.

When the transfer sheet of the present invention is to be used, the sheet is merely placed on the article 5, which for instance is in the form of a shaped product of synthetic fiber, e.g. a textile, rug or other type synthetic fiber containing fabric, with the dissolving agent layer 4 as the outermost layer of the sheet in contact with the surface of the article 5, and then the sheet is heated, for example, at between about 100° to 220° C. for between about 2 to 10 seconds under the highest practicable or efficient possible conventional mechanical printing pressure with the use of a manual pressing iron, hot press, hot cylinder press, high-frequency heater, or the like. The base sheet 1 is thereafter peeled off the article 5, i.e. at the releasing layer 2, whereby a print is obtained which bears the dissolving agent layer 4 and distinct colorfast pattern layer 3 as shown in FIG. 2, i.e. in reverse stratified order to that shown in FIG. 1.

Examples of articles to be printed with the use of the transfer printing sheet of the present invention are woven or knitted fabrics of polyester, polyamide, polyacrylic, polyolefin, polyvinyl and like synthetic fibers, mixtures of such fibers, mixtures thereof with natural fibers such as cotton, rayon, hemp and wool, acetate fibers which are semi-synthetic, etc. All of these synthetic fiber materials are conveniently susceptible to the dissolving action under heat and mechanical pressure of the foregoing dissolving agents for sufficiently breaking down their crystallinity structure or content to render the fiber surface bond receptive to the attendant elastic high-polymer resin of the pattern layer 3.

With the use of the instant transfer sheet, a print of colorfast and distinct design or pattern can be obtained merely by a relatively simple procedure, i.e., application of mechanical pressure and heat, without impairing the hand or feel of such an article 5, irrespective of whether it is colored or not.

Pertinent advantages of the present invention in this regard are as follows:

(a) By the simple procedure of heat transfer, using the instant transfer sheet under printing pressure, a printed synthetic fiber containing article or fabric can be obtained with a very distinct surface pattern having hiding power and outstanding color fastness against rubbing, washing and light, without impairing the hand or feel of the article of fabric which is made of such synthetic fiber and regardless of its color.

(b) The major feature of the present invention is that prints can be prepared very advantageously from shaped articles of synthetic fibers, i.e. of the type which are subjected to water proofing or water repellent treatment, and thus which are surface coated with silicone resin, wax, synthetic resin, or the like.

(c) The pigment and elastic high-polymer resin are fixed to the surface of the article printed therewith, without penetrating thereinto beyond the immediate surface level thereof in contrast to the case with the usual thermal flow printing method. This assures efficient color printing at the fabric surface itself and enables a relatively small amount of elastic resin to be used for such surface bonding to afford color fastness and flexibility as well due to the elastic nature of the high-polymer resin used. Accordingly, the print has soft hand and finds wider use than otherwise.

(d) Articles of whatever form, e.g., in the form of piece goods, cutout or sewing, can be printed easily by way of the present invention.

The present invention will be described with reference to the following examples, set forth by way of illustration and not limitation, and in which the parts are all by weight unless otherwise specifically indicated:

EXAMPLE 1

Parchment paper was coated over the entire surface thereof with a mixture of 5 parts of silicone resin, 10 parts of amide-type wax and 85 parts of xylol by a roll coater to form a releasing resin layer.

A flowering plant pattern of varying color densities was screen-printed on the releasing layer with a green printing ink comprising 5 parts of copper Phthalocyanine Green as organic pigment, 60 parts of 46% solution of a heat-crosslinkable acrylic resin, i.e., butyl acrylate-acrylonitrile-butoxy-methylacrylamide terpolymer (composed of 69.1% of butyl acrylate, 23.1% of acrylonitrile and 8.8% of butoxymethylacrylamide and having a melting point of 80° C.), as elastic high polymer resin, in a mixture of ethyl acetatetoluene (1:1) as solution solvent for the resin, and 35 parts of ethylene glycol butyl ether as an organic solvent for the ink. The print was dried in air at 25° C. to form a green pigment-resin layer.

The green pigment-resin layer was further printed with a white printing ink comprising 18 parts of titanium oxide as inorganic pigment, 55 parts of 43% solution of butyl acrylate-acrylonitrile copolymer (composed of 76.3% of butyl acrylate and 23.7% of acrylonitrile and having a melting point of 78° C.) as elastic high polymer resin in a mixture of ethyl acetate-toluene (1:1) as solution solvent for the resin, 1 part of ammonium sulfate powder serving as a cross-linking catalyst, and 26 parts of butyl cellosolve as an organic solvent for the ink. The white ink was applied with the same screen as used for the green ink and dried in air at 25° C. in similar manner.

The resulting flowing plant pattern layer printed in white (top sub-layer) superimposed on green (bottom sub-layer) was further printed with a printing ink comprising 3.5 parts of salicylic acid (dissolving agent), 2.5 parts of p-phenylphenol (dissolving agent), 65 parts of the same 43% solution copolymer resin solution (film forming substance) as used for the white ink, 2 parts of ethylcellulose (film forming substance), and 27 parts of butyl cellosolve (solvent), using the same screen as above. The printing ink was dried in air at 25° C. to form a dissolving agent layer. Thus a multi-layer transfer printing sheet was obtained.

The flowering plant pattern bearing transfer printing sheet was placed on a polyester crepe de chine (textile fabric) colored black over the entire surface, with the dissolving agent layer in contact with a predetermined portion of the fabric, and then heated at 160° C. for 10 seconds by an iron with application of mechanical pressure.

Thus, the green pigment-resin layer, white pigment-resin layer and dissolving agent layer of the sheet were fixed to the black polyester fabric, and the paper was peeled off, whereby a print was obtained which was formed with a distinct green flowering plant pattern on the black background.

The printed fabric had a very soft hand. Table 1 reveals that the above noted dissolving agent layer of the present invention achieved a remarkable effect on various durability and color fastness properties, as compared with comparisons of the same sheet in which only the film forming substances and solvent were present in the "dissolving agent" layer (Comparison 1) and in which the dissolving agent layer was completely omitted (Comparison 2).

TABLE 1

| | Transfer sheet | | |
|---|---|---|---|
| Durability | Sheet of Example 1 (Invention) | Same sheet without agent* (Comparison 1) | Same sheet without dissolving agent layer (Comparison 2) |
| Light fastness | A | A | A |
| Rubbing fastness | A | B | B |
| Wash fastness | A | B | B |
| Peel resistance | A | C | C |
| Solvent resistance | A-B | C-D | C-D |

*Without the dissolving agent in the dissolving agent layer.

The print was tested for light fastness or color fastness, rubbing fastness and wash fastness according to JIS standards, for peel resistance by affixing a commercial cellophane tape to the pattern bearing surface of the print and then peeling off the tape to check separation and transfer of the pattern to the adhesive surface of the tape, and for solvent resistance in terms of dry-cleanability according to JIS standards.

The durability results were evaluated according to the criteria of: A, excellent; B, good; C, fair; and D, poor.

The same test methods and criteria are used for Table 2.

EXAMPLE 2

A 20% toluene solution of silicone resin was applied to the entire surface of cellophane paper by gravure coating to form a releasing resin layer.

A pattern layer was then formed on the layer by printing a pattern of closely arranged polka dots, 8 mm in diameter, thereon by a rotary screen (30 mesh), using a red printing ink comprising 50 parts of 35% xylol solution of HIPALON #30 (trademark) as elastic high polymer resin, 10 parts of nylon resin powder (300 mesh) as film forming substance, 5 parts of PERMANENT RED E5B (trademark) as pigment, 2 parts of ORBEN (trademark) and 33 parts of xylol as an organic solvent for the ink.

Immediately thereafter (before drying), a 8:2 mixture of nylon resin powder (300 mesh) as film forming substance and powder of o- and p-toluenesulfoamides in admixture as dissolving agents, was sprayed onto the entire surface of the pattern layer for forming a dissolving agent layer thereon. The unadhered particles were then removed from the resulting sheet by a vacuum suction device, giving a transfer printing sheet having a dissolving agent layer formed in registry with the red color pattern layer.

The sheet was placed on a specified portion of a white nylon tricot fabric, with the surface of the dissolving agent layer in contact with the fabric, and the sheet was heated at 180° C. for 2 seconds by a hot calender with application of mechanical pressure.

Consequently, the pattern layer and dissolving agent layer of the sheet were fixed to the nylon fabric, and the paper was then peeled off to give a printed nylon tricot print having a soft hand and bearing a distinct pattern of closely arranged red polka dots.

The printed pattern was found to have outstanding durability in the same way as in Example 1.

EXAMPLE 3

Three kinds of fabrics, i.e., a nylon twill fabric, and the same fabrics treated with silicone resin or with wax and thereby made repellent to water, were each printed with a pattern with the use of the transfer printing sheet of Example 2, or a transfer printing sheet prepared in the same manner as in Example 2 except that nylon resin powder only was sprayed as film forming substance onto the pattern layer for comparison (Comparison 3). The sheets were heated at 180° C. for 8 seconds with the application of pressure using a hot press.

The fastness properties of the prints are shown in Table 2, which reveals that the three fabrics treated according to the present invention achieve outstanding effects, per the methods and criteria as noted in Example 1 for Table 1, as compared to the corresponding three fabrics in the case where the dissolving agent is omitted from the "dissolving agent" layer.

TABLE 2

| Color Fastness | Sheet of Example 2 (Invention) Fabric Treatment | | | Comparison sheet (Comparison 3) Fabric Treatment | | |
|---|---|---|---|---|---|---|
| | None | Silicone resin | Wax | None | Silicone resin | Wax |
| Rubbing Fastness | A | A-B | B | A-B | C-D | C-D |
| Wash Fastness | A | A-B | A-B | B | D | D |
| Peel Resistance | A | A | A | B | | D |
| Solvent Resistance | A-B | B | B | C | D | D |

EXAMPLE 4

A pure white paper rendered smooth-surface with styrene-maleic anhydride resin was coated over the entire surface with a solution of 10 parts of amide-type wax and 90 parts of xylol by a gravure coater to form a releasing resin layer.

A pattern layer was then formed on the layer by printing a one-point pattern of alphabet thereon by a screen (90 mesh), using a white printing ink comprising 40 parts of MATSUMINSOL MR-71 (trademark for methylolacrylamideacrylic acid ester copolymer in the form of a self-crosslinkable emulsion) as elastic high polymer resin, 2 parts of TYLOSE MH-300, 5 parts of REPITOL G (trademark for emulsifier), 20 parts of semirutile type titanium white as inorganic pigment, 20 parts of mineral terpene as solvent for the ink and 13 parts of water.

Subsequently, a dissolving agent layer was formed over the pattern layer to a larger size 0.2 mm outwardly beyond the contours of the pattern with a screen (60 mesh), thereby forming an overlapping dissolving agent layer border over the pattern layer, using a printing ink comprising 10 parts of microcapsule beads prepared from a mixture of cresol and bisphenol A as dissolving agents (per Reference Example 4A), 20 parts of MATSUMINSOL MR-71 (trademark) as film forming substance, 20 parts of 3% aqueous solution of sodium alginate, 30 parts of mineral terpene as organic solvent, 2 parts of magnesium chloride hexahydrate, 3 parts of REPITOL G (trademark) as emulsifier, and 10 parts of water. After drying, the resulting sheet was heat-treated at 80° C. for 5 minutes to form a coating of emulsifiable resin to obtain a transfer printing sheet.

The sheet was placed on a blended yarn fabric of polyester and cotton (65:35) both dyed in prussian blue color with a disperse dye and reactive dye, with the dissolving agent layer in contact with a specified portion of the fabric, and was heated at 200° C. for 10 seconds by a hot press with the application of mechanical pressure.

In this way, the pattern layer and the dissolving agent layer of the transfer printing sheet were fixed to the blended yarn fabric, and the paper was thereafter peeled off to give a print of soft hand printed with distinct white alphabet symbols on the prussian blue background.

The pattern of the print was very colorfast and had a satisfactory commercial value.

For comparison, a transfer printing sheet was prepared in the same manner as in the present Example except that the microcapsules were not used, i.e. the dissolving agents were omitted from the "dissolving agent" layer. The latter (Comparison 4) sheet was found to be considerably inferior to the former sheet (of the invention).

A further printing ink was prepared in the same manner as in the present Example except that in place of the microcapsules, the corresponding amounts of cresol and bisphenol A were directly incorporated into the ink. The resulting (Comparison 5) ink was low in storage stability, exhibited a tendency toward gelation and permitted vaporization of cresol in the final thermal coating forming step. This last mentioned ink was therefore unsuitable.

Since the print obtained in the present Example gives off a slight cresol odor, it is desirable to soap or wash the print in a simple manner to remove the remainder of this chemical.

REFERENCE EXAMPLE 4A

The microcapsules used in Example 4 were prepared in the following manner.

4.25 Parts of EPIKOTE 834 (trademark for epoxy resin) were dissolved in a mixture of 20 parts of m-cresol and 5 parts of bisphenol A at an elevated temperature of 65° C., and the resulting oily solution was added dropwise to 150 parts of 5% aqueous solution of gelatin with forced agitation of the ingredients. Subsequently, a solution of 2.55 parts of Curing Agent U (trademark for polyamine) in a suitable quantity of hot water was slowly admixed with the mixture of the agitated ingredients, and the resulting mixture was continuously stirred at 65° C. for about 5 hours, giving spherical solid particles having the m-cresol and bisphenol A enclosed or encapsulated therein. The reaction mixture was cooled to room temperature and filtered, and the solids were dried in air to obtain dry particles, which were 0.005 to 0.08 mm in mean size or diameter.

While various specific embodiments of the invention have been shown and described in detail to illustrate the application of the principles and inherent features of the invention, it will be understood that the invention may be embodied otherwise without departing from such principles and inherent features.

What is claimed is:

1. Transfer printing sheet for transferring a pattern onto an article of synthetic fibers, comprising a base sheet having a coatable surface, a releasing resin layer at least partially coating the coatable surface of the base sheet, a pattern in the form of a pattern layer printed on the releasing resin layer and comprising an elastic high polymer resin and a pigment in admixture, and a dissolving agent layer containing an agent of monomeric organic compound constitution or of inorganic compound constitution for dissolving adjacent surface portions of synthetic fibers of an article onto which the pattern is to be transferred, the dissolving agent layer covering the entire surface of the pattern layer, whereby the pattern of the pattern layer can be transferred onto the article of synthetic fiber when the sheet is subjected to heat and printing pressure with the dissolving agent layer in contact with the article.

2. Sheet of claim 1 wherein the elastic high polymer resin of the pattern layer comprises a heat-crosslinkable resin.

3. Sheet of claim 1 wherein the pattern layer comprises a composite layer formed of a plurality of superposed sub-layers.

4. Sheet of claim 1 wherein the pattern layer comprises a composite layer formed of a colored pigment sub-layer and a white pigment sub-layer superimposed thereon.

5. Sheet of claim 1 wherein the dissolving agent layer is formed by printing the pattern layer with a printing ink containing the agent for dissolving synthetic fibers.

6. Sheet of claim 1 wherein the elastic high polymer resin has a melting or softening point of substantially between about 50°-150° C.

7. Method of printing a substantially colorfast and distinct pattern onto the surface of an article of synthetic fiber which comprises applying heat and mechanical pressure to the transfer printing sheet of claim 1 while the dissolving agent layer thereof is in operative contact with the adjacent synthetic fibers at the surface of the article and sufficiently for the corresponding dissolving agent to modify such synthetic fibers to render the surface portions thereof locally receptive to the elastic high polymer resin of the pattern layer and for such elastic high polymer resin to flow into and adhere firmly to the dissolving agent modified synthetic fibers at the surface of the article and thereby transfer the pattern of the pattern layer to the article.

8. Method of claim 7 wherein the printing is effected at a temperature of substantially between about 100°-220° C. for a duration of substantially between about 2-10 seconds.

9. Method of claim 8 wherein the elastic high polymer resin has a melting or softening point of substantially between about 50°-150° C.

10. Article printed by the method of claim 7.

11. Article printed by the method of claim 8.

12. Article printed by the method of claim 9.

* * * * *